US007302806B2

(12) United States Patent
Parsch et al.

(10) Patent No.: US 7,302,806 B2
(45) Date of Patent: Dec. 4, 2007

(54) MOTOR VEHICLE WITH AN AIR-CONDITIONING SYSTEM

(75) Inventors: Willi Parsch, Seeheim (DE); Frank Rinne, Worrstadt (DE)

(73) Assignee: Luk Fahrzeug-Hydraulik GmbH & Co., KG, Bad Homburg (DE)

( * ) Notice: Subject to any disclaimer, the term of this patent is extended or adjusted under 35 U.S.C. 154(b) by 1131 days.

(21) Appl. No.: 10/462,025

(22) Filed: Jun. 12, 2003

(65) Prior Publication Data

US 2004/0003614 A1 Jan. 8, 2004

Related U.S. Application Data

(63) Continuation of application No. PCT/DE01/03777, filed on Sep. 26, 2001.

(30) Foreign Application Priority Data

Dec. 14, 2000 (DE) ............................... 100 62 455

(51) Int. Cl.

| | |
|---|---|
| ***F25B 1/00*** | (2006.01) |
| ***F25B 49/00*** | (2006.01) |
| ***B60H 1/32*** | (2006.01) |

(52) U.S. Cl. ......................... 62/228.1; 62/230; 62/244

(58) Field of Classification Search .............. 62/228.1, 62/126, 230, 239, 244
See application file for complete search history.

(56) References Cited

U.S. PATENT DOCUMENTS 4,976,589 A * 12/1990 Ide ............................. 417/34

FOREIGN PATENT DOCUMENTS

DE 39 05 542 10/1989
DE 196 42 832 A1 9/1997

* cited by examiner

*Primary Examiner*—Chen-Wen Jiang
(74) *Attorney, Agent, or Firm*—Darby & Darby P.C.

(57) ABSTRACT

In a motor vehicle with a combustion engine, an electronic engine-management device, and an air-conditioning system with an air-conditioning control device, the air-conditioning compressor has reciprocating pistons whose displacement stroke is adjustable through one or more control valves. The electronic engine-management device has direct access to and priority control over the adjustment of the piston stroke, so that the electronic engine management device takes precedence over the air-conditioning control device in controlling the adjustment of the piston stroke.

10 Claims, 3 Drawing Sheets

MOTOR VEHICLE WITH AN AIR-CONDITIONING SYSTEM

CROSS-REFERENCE TO RELATED APPLICATION

This application is a continuation of International Patent Application Serial No. PCT/DE 01/03777 filed Sep. 26, 2001, published in a non-English language, and which is hereby incorporated by reference in its entirety.

BACKGROUND OF THE INVENTION

The invention relates to a motor vehicle with an air-conditioning system that has an air-conditioning compressor in which the compressor throughput is regulated by adjusting the piston stroke. The adjustment of the piston stroke is accomplished by controlling the drive-chamber pressure of the compressor by means of a control valve. The air-conditioning system has a control device using characteristic curve fields or data arrays. The combustion engine of the motor vehicle is equipped with an electronic engine-management device.

Motor vehicles with air-conditioning systems meeting the foregoing description belong to the known state of the art. They have air-conditioning controllers performing a quasi-static control based on characteristic fields or arrays. These state-of-the-art system have a problem in situations where the torque reserve of the combustion engine is inadequate, for example if the vehicle is to be accelerated abruptly from a state where the engine is generating only an idling-level torque or a part of its capacity-level torque, where the torque delivered by the engine is needed to accelerate the vehicle. As the engine is unable to supply the additional torque for the air conditioner, and the latter cannot be regulated to a lower torque level with a sufficiently fast response by the conventional control devices, the additional amount of torque consumed by the air-conditioning compressor may cause the engine to stall or will in any case cause a sluggish acceleration of the vehicle. Conversely, with a sudden increase in the available engine torque, the throughput of the air-conditioning compressor cannot be turned up by the control system with a fast dynamic response.

OBJECT OF THE INVENTION

It is therefore the object of this invention to propose a regulation of an air-conditioning compressor that is free of the aforementioned drawbacks.

SUMMARY OF THE INVENTION

A motor vehicle with an air-conditioning system according to the present invention has an air-conditioning compressor in which the compressor output is regulated by adjusting the piston stroke. The adjustment of the piston stroke is accomplished by controlling the pressure in the drive chamber of the compressor by means of a control valve. The air-conditioning system has a control device using characteristic curve fields or data arrays. The combustion engine of the motor vehicle is equipped with an electronic engine-management device. According to the inventive concept, the electronic engine-management device has direct access to the piston-stroke adjustment of the air-conditioning compressor, taking priority over the air-conditioning control device. In a situation where the combustion engine does not have enough torque available to drive the air-conditioning compressor with an at least partially deployed piston drive element such as a tilt-adjustable swash plate or wobble plate, the invention provides that the electronic engine-management device will cause at least a partial retraction of the tilt angle of the piston drive element. Further in the motor vehicle with the air-conditioning system according to the invention, when there is enough engine torque available to drive the air-conditioning compressor, the electronic engine-management device will return the control of the tilt-angle regulation to the air-conditioning control device and restore the tilt angle of the piston-drive element with a fast response time.

In a motor vehicle with an air-conditioning system according to the invention, the priority control function has a direct controlling access to the at least one regulating valve that performs the piston-stroke adjustment. Under a further preferred concept, the priority control function has direct access to an internal control loop with torque monitoring at the compressor. A further motor vehicle with an air-conditioning system according to the invention is distinguished in that the priority control function has a direct controlling access to an internal control loop with torque monitoring at the compressor based on data values calculated from the signals of several different sensors of the air-conditioning system.

In a further preferred embodiment of the invention, the priority control function is arranged in an integrated control box in the area of the air-conditioning compressor. Receiving from the engine-management device an input signal representing a given amount of torque, the control box controls the at least one regulating valve which performs the adjustment of the piston stroke. In a further preferred embodiment of the motor vehicle with the air-conditioning system, the actual current value of the drive torque of the compressor is available as a further input quantity for the control box.

A further embodiment of the invention is distinguished in that the current actual value of the drive torque of the compressor can be determined through a direct measurement at the compressor or calculated on the basis of measurement values of the air-conditioning system using a characteristic curve or data field.

BRIEF DESCRIPTION OF THE DRAWINGS

The following detailed description of the invention refers to the attached drawings, wherein.

DETAILED DESCRIPTION OF PREFERRED EMBODIMENTS

Figure 1:
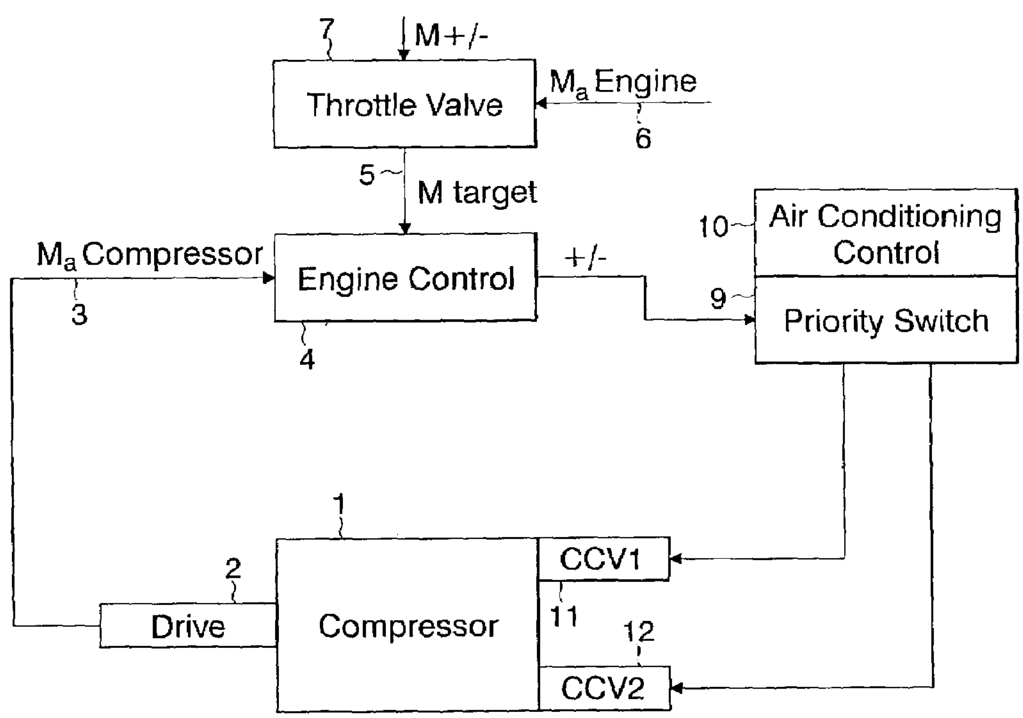
FIG. 1 represents a control loop of the priority control function.

The block diagram of FIG. 1 shows an air-conditioning compressor 1 with a compressor drive 2. A current actual compressor drive torque 3 is detected at the compressor drive 2 and received by the engine control unit 4, where the actual compressor drive torque 3 is compared to a targeted compressor torque value 5 that is calculated from the torque reserve that the combustion engine has available to carry the additional load of driving the air-conditioning compressor. The torque reserve is determined within the engine management device based on data of the combustion engine such as the actual engine torque 6 and the position of a throttle valve 7. The engine control device 4 sends a control signal 8 to the priority control device 9 which, in response to the control signal 8, regulates the air-conditioning compressor to increase or decrease its throughput of air-conditioning fluid. The priority control device is arranged to take precedence over the air-conditioning control device or regulation device 10 and overrides the signals that would normally be sent from the air-conditioning control device 10 to the compressor. In the illustrated arrangement of FIG. 1, the priority control device acts directly on the compressor control valves 11 (CCV1) and 12 (CCV2). The two control valves regulate the flow of air-conditioning fluid into and out of the compressor drive chamber and thereby control the tilt angle of the piston drive element—specifically a swash plate or wobble plate—of the air-conditioning compressor.

Figure 2:
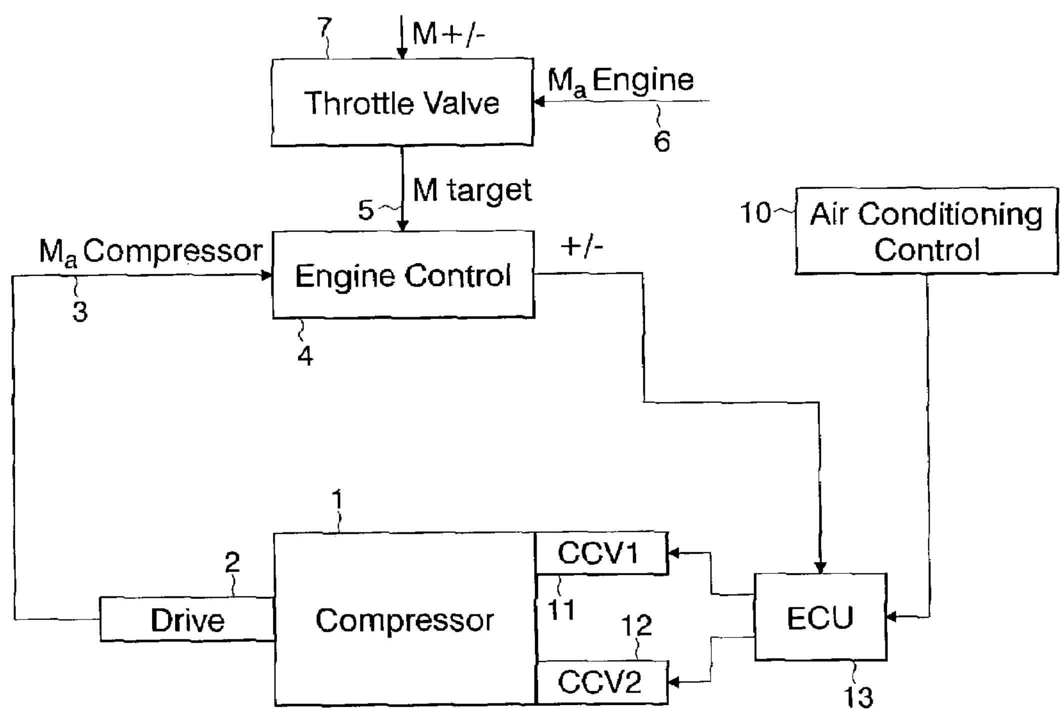
FIG. 2 represents a further embodiment of a control loop with a priority control function.

FIG. 2 represents a variation of the control loop of FIG. 1. The description of components that have already been described in the context of FIG. 1 applies identically to FIG. 2. The arrangement shown in FIG. 2 differs from FIG. 1 in that the control target signal 8 for the compressor torque is sent to an electronic control unit (ECU) 13 which belongs to the compressor and gives priority to the control target signal 8 over the signal that arrives from the air-conditioning control device 10.

Figure 3:
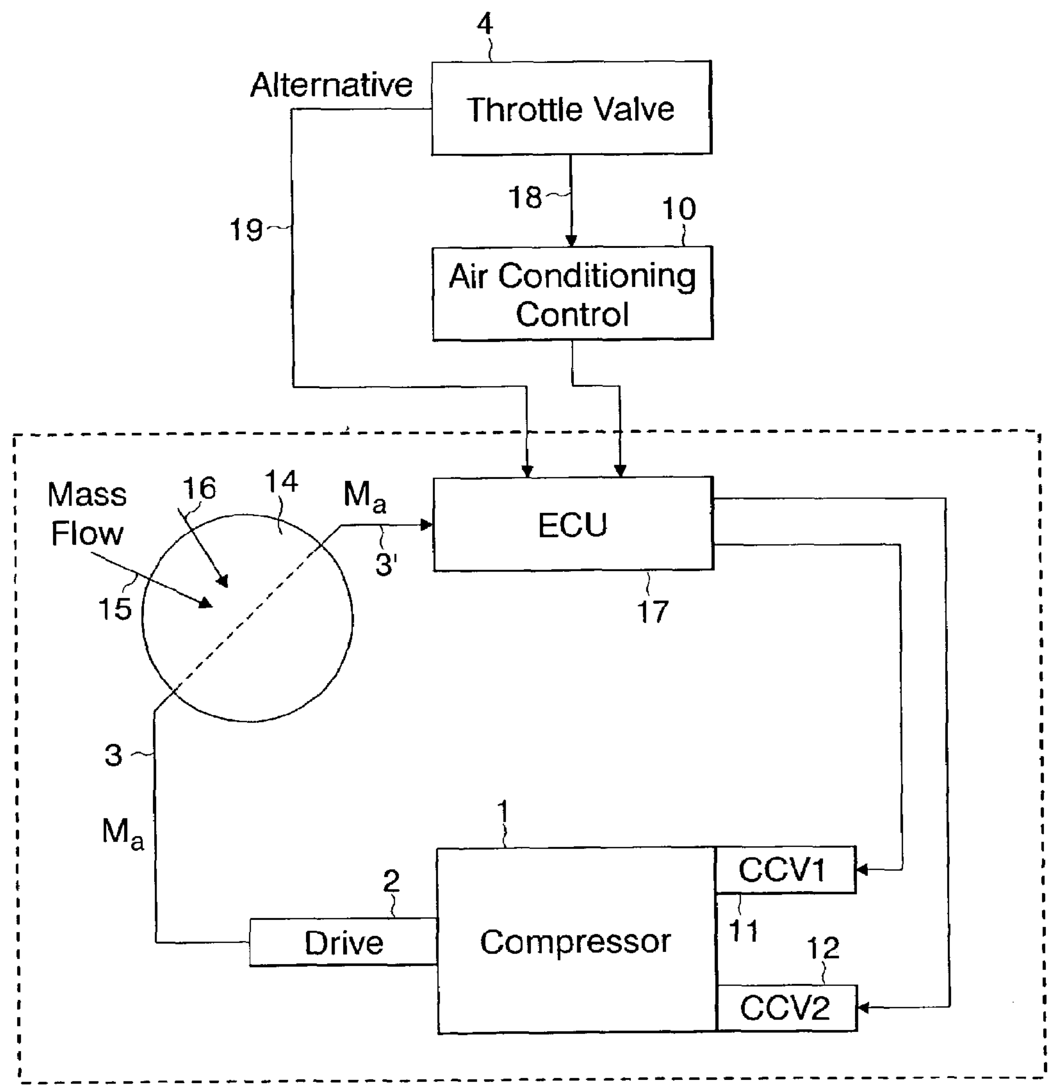
FIG. 3 represents a third embodiment of a control loop with a priority control function.

The embodiment of FIG. 3, likewise, shares elements of FIGS. 1 and 2 that have already been described. The embodiment of FIG. 3 is distinguished in that the engine control device sends a signal 18 representing the torque reserve of the engine directly to the air-conditioning control device 10. Alternatively, the torque reserve available from the engine is communicated as a signal 19 to an electronic control unit 17, in parallel with the signal of the air-conditioning control device 10. The electronic control unit 17 could be considered as an integrated functional box arranged in the area of the compressor. The electronic control unit 17 transmits signals to the compressor control valves 11 (CCV1) and 12 (CCV2). As a further difference from the preceding embodiments, the actual drive torque of the air-conditioning compressor 1 is determined on the basis of characteristic data 14 of the air-conditioning control loop, for example by way of a calculation based on the mass flow rate 15 or the pressure ratio 16 between the output pressure and the suction pressure, and possibly from other data, and the result of the calculation is entered into the electronic control unit 17 as an actual torque value 3'.

In summary, the invention proposes the concept of controlling the tilt angle through the engine-management device and thus controlling the air-conditioning system with an overriding priority input from the engine-management device. As an alternative, the control can be realized as an internal control loop with detection of the torque at the compressor or through data values calculated from various sensor signals in the air-conditioning system, in some cases with an integrated regulating box at the compressor assigning priority to the engine control device.

As a prerequisite in both cases, the compressor needs to react to control inputs with a very fast dynamic response and a low level of mechanical hysteresis.

By letting the engine control device act directly on the compressor control valves, it is possible to realize a control loop for the torque regulation that responds very quickly to dynamic changes. Under the inventive concept, the torque reserve available from the combustion engine at any given time to drive the air-conditioning compressor can be determined, for example from the position of the throttle valve. If the result conflicts with the air-conditioning control unit 10, the priority control device allows the control signal from the engine control unit to take precedence and override the air-conditioning control unit 10. The invention further offers the possibility to provide a control loop in which the torque adjustment is performed by way of an additional control box which is located at the air-conditioning compressor and controls the compressor control valves. The input quantities for the electronic control unit are a targeted amount as well as the actual current amount of the drive torque of the air-conditioning compressor. The actual current drive torque can be determined by a direct measurement at the compressor or based on measured values of the air-conditioning loop and using a characteristic data field.

By using the foregoing control concepts according to the invention, one can ensure that the requirement for the vehicle to remain drivable or maintain a level of driving performance always takes priority over the air-conditioning control, or that the regulation finds a compromise in which the maximum amount of engine torque that remains available is used to drive the air-conditioning compressor.

What is claimed is:

1. A motor vehicle, comprising a combustion engine with an electronic engine-management device and further comprising an air-conditioning system with a compressor and with an air-conditioning control device using characteristic data fields; wherein the compressor has reciprocating pistons whose displacement stroke is adjustable, a drive chamber receiving fluid under pressure, and at least one control valve; and wherein the piston stroke is adjusted by controlling the fluid pressure in the drive chamber by means of the at least one control valve, wherein further the electronic engine-management device has direct access to and priority control over said adjustment of the piston stroke and, by virtue of said priority control, the electronic engine management device takes precedence over the air-conditioning control device in controlling said adjustment of the piston stroke.

2. The motor vehicle of claim 1, wherein the compressor comprises a piston-drive element having an adjustable tilt angle, and wherein, if the combustion engine does not have enough torque available to drive the air-conditioning compressor with the piston-drive element at least partially deployed, the electronic engine-management device will cause at least a partial cutback of said tilt angle.

3. The motor vehicle of claim 2, wherein if the combustion engine subsequently has enough torque available to drive the air-conditioning compressor with the piston-drive element at least partially deployed, the electronic engine-management device will return control of the tilt-angle regulation to the air-conditioning control device.

4. The motor vehicle of claim 1, wherein said priority control comprises a direct controlling access to the at least one control valve.

5. The motor vehicle of claim 1, wherein the air-conditioning system comprises an internal control loop using a detected driving torque of the compressor as a control variable, and wherein said priority control comprises a direct controlling access to said internal control loop.

6. The motor vehicle of claim 1, wherein the air-conditioning system comprises sensors and further comprises an internal control loop using a driving torque of the compressor as a control variable, said driving torque being calculated from signals generated by the sensors, and wherein said priority control comprises a direct controlling access to said internal control loop.

7. The motor vehicle of claim 1, further comprising an integrated control box arranged in the area of the compressor, wherein said priority control is performed by the integrated control box controlling the at least one control valve based on an input signal, and wherein the input signal comprises a target value for the compressor torque received from the engine-management device.

8. The motor vehicle of claim 7, wherein the input signal further comprises an actual value for the compressor torque.

9. The motor vehicle of claim 8, wherein said actual value is based on a direct measurement at the compressor.

10. The motor vehicle of claim 8, wherein the actual value is calculated from measurement values of the air-conditioning system by way of a characteristic data field.

* * * * *